INVENTORS
Gustave S. Baxter
Thom C. Baxter
BY
ATTORNEY.

INVENTORS.
Gustave S. Baxter
Thom C. Baxter
BY Stanley Hood
ATTORNEY.

Patented May 12, 1942

2,283,032

UNITED STATES PATENT OFFICE 2,283,032

BREAD LOAF BAKING AND APPARATUS THEREFOR

Gustave S. Baxter and Thom C. Baxter, Detroit, Mich., assignors to The Edward Katzinger Company, Chicago, Ill., a corporation of Illinois Application April 19, 1940, Serial No. 330,500

2 Claims. (Cl. 53—6)

The present invention relates to the baking of a bread loaf of normally non-circular cross-sectional contour and more particularly to a baking pan for the production of an article of this character.

In large scale production of wrapped baked goods, Cellophane, wax paper, glassine paper or other suitable packaging material, is folded around the goods to be wrapped, with the overlapped ends of the wrapper arranged across the bottom face of the goods, and the intermediate film on the inner surfaces of the overlapped wrapper ends is melted under the pressure of heated irons or dies to seal the wrapper. It is therefore desirable to produce baked goods having accurate wrapper engaging surfaces on the bottom face thereof against which the wrapper may be firmly pressed under the action of the heated dies.

Due to certain reactions which may take place in the dough after baking and during cooling, the bottoms of bread loaves and the like, when baked in the usual flat bottomed pans, will frequently acquire a hollow or concave shape. When this condition develops prior to the wrapping of the loaf, the bottom face of the loaf does not furnish the support required for proper action of the sealing dies, with the result that the package is poorly sealed.

It is therefore an object of this invention to provide a pan for use in baking a bread loaf of normally non-circular cross-sectional contour having an internal surface of novel construction and arrangement by means of which the bottom face of a bread loaf baked thereon is adapted to acquire a contour and crust characteristic effective to resist cavitation incident to cooling and settling of the loaf and thereby maintain accurate wrapper engaging surfaces on the loaf bottom during wrapper sealing operations.

With the above and other objects in view, as will be apparent, this invention consists in the construction, combination and arrangement of parts and operations, all as hereinafter more fully described, claimed and illustrated in the accompanying drawings, wherein:

Referring more specifically to the drawings, we have shown the apparatus for producing a baked bread loaf in accordance with this invention, as a bread pan of conventional rectangular plan or shape, wherein the bottom 10 is surrounded about its perimeter with substantially flat vertical side walls 11 and flat end walls 12.

Figure 1:
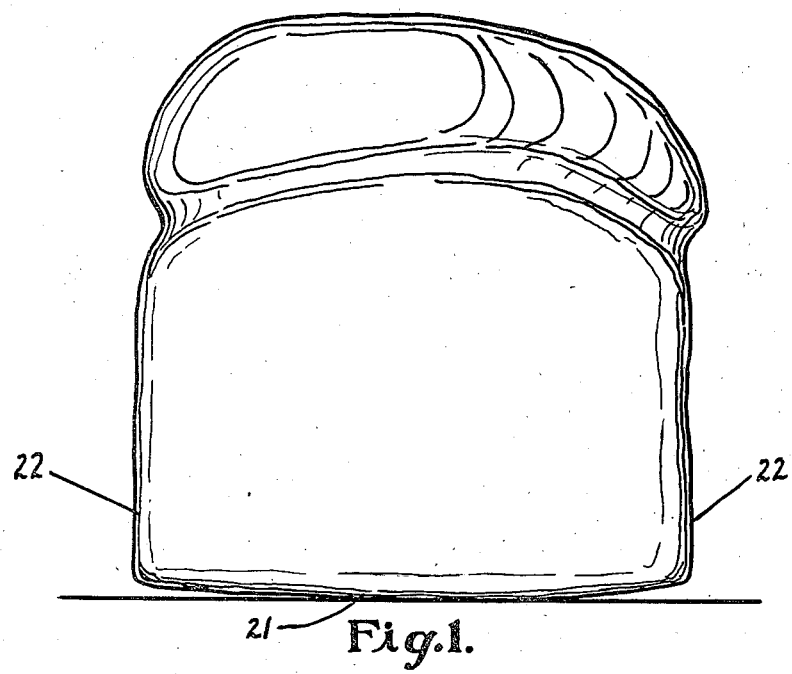
Fig. 1 is an end elevation of a baked bread loaf produced in accordance with this invention.
Figure 2:
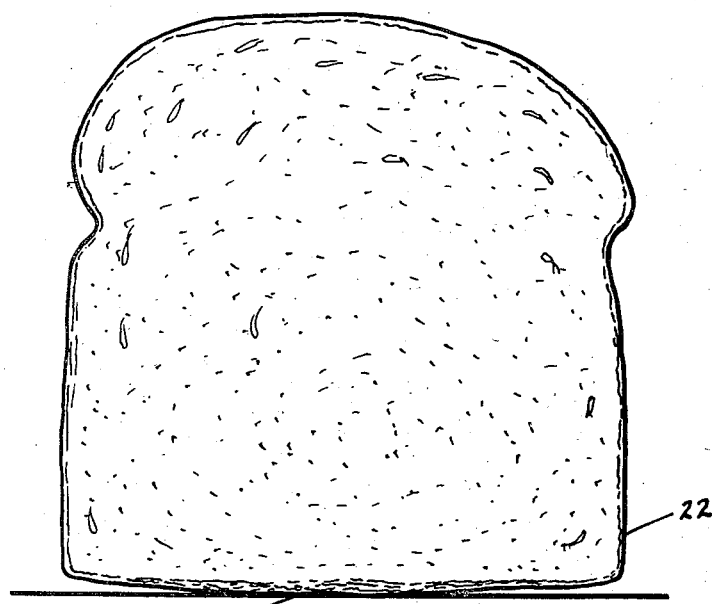
Fig. 2 is a transverse sectional view of the loaf shown in Fig. 1.
Figure 4:
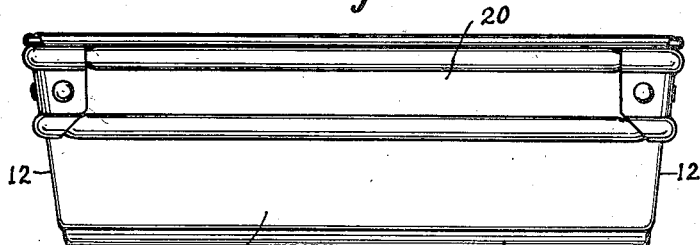
Fig. 4 is an end elevation of the pan set shown in Fig. 3.
Figure 5:
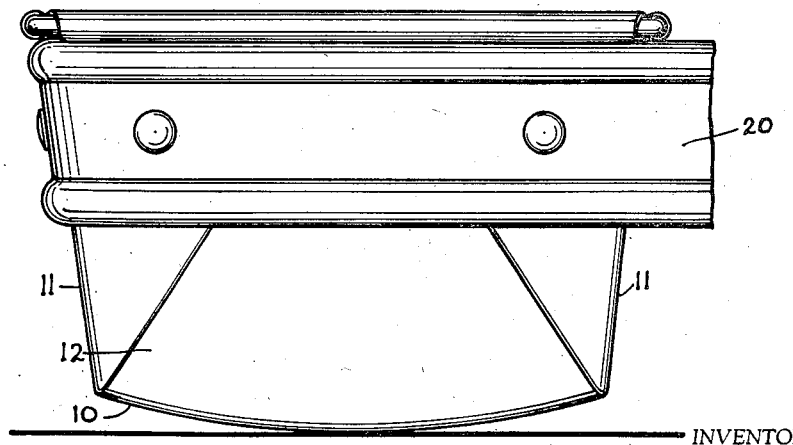
Fig. 5 is a fragmentary enlarged end elevational view illustrating an end pan of the pan set shown in Fig. 3.

As clearly shown in Figs. 4 and 5 of the drawings, the bottom 10 is arranged to provide a relatively narrow internal surface area extending centrally and longitudinally of the side walls 11, said area being disposed below a plane through the bases or lower extremities of the side walls 11, while the sidewallward areas of said bottom surface are oppositely downwardly inclined and arranged to merge into said central area to form therewith a smooth downwardly arched internal surface substantially throughout the area of the bottom 10. Due to this construction and arrangement of the internal surface of the bottom 10, the midbottom portion of a dough mass confined and baked in the pan is so lowered as to absorb more baking heat than the sidewallward bottom portions thereof which are supported in upwardly inclined relation to said mid-bottom portion. Thus, in addition to shaping the loaf bottom in a convex-like formation substantially complementary to the internal contour of the bottom 10, as shown in Figs. 1 and 2, the bottom of the loaf during baking acquires a relatively thick crust in the central or mid-portion thereof and a crust of gradually diminishing thickness from said midportion toward the sides or edges of the loaf bottom. The action of forces tending to cause inward sagging or cavitation of the bottom face of the loaf incident to cooling and settling thereof preparatory to wrapping of the loaf in a wrapper sealing machine is accordingly resisted through the efficiency of a pan constructed and arranged as contemplated by this invention.

It is to be understood that the depth of the lowermost or central area of the bottom 10 with respect to the bases or lower extremities of the pan walls is preferably such that the bottom of the dough mass surrounding the central lowered portion thereof will acquire a normal crust characteristic while the central bottom portion is being baked. Lowering of the central bottom area to a depth of from one-fourth inch to one-half inch in a pan of three inch depth and four inch width has been found to give satisfactory results.

Figure 3:
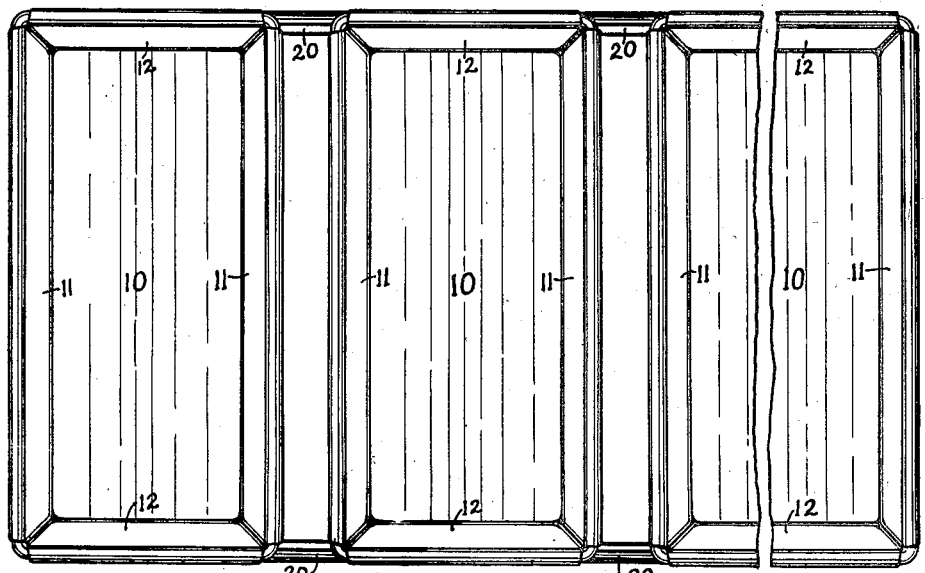
Fig. 3 is a fragmentary plan view of a pan set embodying several of the individual pans forming a part of the present invention.

In order that the pan so provided with an arched bottom 10 may be supported upright in equilibrium, it is contemplated that three or more pans of this type be incorporated into a unit in any well known manner, such as shown in Fig. 3, wherein a strap 20 is applied to the end walls 12 of the associated laterally spaced and aligned pans.

What is claimed is:

1. A baking pan comprising an open top receptacle of rectangular plan having spaced upright substantially flat side and end walls and a bottom enclosed by said side and end walls, said bottom having a relatively narrow internal surface area extending centrally of said side walls and disposed not less than one-sixteenth inch below a plane through the sidewallward limits of said bottom per inch of distance between said side walls measured in said plane, and oppositely downwardly inclined sidewallward areas merging gradually into said central area to form therewith a smooth downwardly arched inner surface of uniform transverse cross-sectional contour substantially throughout the distance of said bottom between said end walls.

2. A baking pan comprising an open top receptacle of rectangular plan having spaced upright side walls, spaced upright end walls substantially farther apart than the side walls, and a bottom enclosed by said side and end walls, said bottom having a relatively narrow internal surface area extending centrally of said side walls and disposed below a plane through the sidewallward limits of said bottom, and oppositely downwardly inclined sidewallward areas merging gradually into said central area to form therewith a smooth downwardly arched inner surface of uniform transverse cross-sectional contour substantially throughout the distance of said bottom between said end walls.

GUSTAVE S. BAXTER.
THOM C. BAXTER.